United States Patent
Lung et al.

(10) Patent No.: US 6,493,439 B2
(45) Date of Patent: *Dec. 10, 2002

(54) ANALOG CALLER IDENTIFICATION TRANSMISSION METHOD AND APPARATUS

(75) Inventors: En-Kuang Lung, Fremont, CA (US); Leo Liu, Palo Alto, CA (US); Donggun Keung, Milpitas, CA (US); Tzerng-Hong Lin, Milpitas, CA (US)

(73) Assignee: AltiGen Communications, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/922,499

(22) Filed: Aug. 2, 2001

(65) Prior Publication Data

US 2002/0064264 A1 May 30, 2002

Related U.S. Application Data

(63) Continuation of application No. 09/255,359, filed on Feb. 23, 1999, now Pat. No. 6,292,549.
(60) Provisional application No. 60/115,879, filed on Jan. 13, 1999.

(51) Int. Cl.$^7$ .......................... H04M 1/56; H04M 1/00; H04M 3/42
(52) U.S. Cl. ........................... 379/142.01; 379/142.17; 379/156; 379/211.02; 379/212.01; 379/142.14
(58) Field of Search .................. 379/88.11, 88.19, 379/88.21, 142.01, 142.04, 142.07, 142.12, 142.17, 211.01, 211.02, 212.01, 156, 157, 165, 265.01, 252, 142.14

(56) References Cited

U.S. PATENT DOCUMENTS

| | | | | | |
|---|---|---|---|---|---|
| 5,008,930 | A | * | 4/1991 | Gawrys et al. | 379/210.01 |
| 5,249,221 | A | * | 9/1993 | Ketring | 379/214.01 |
| 5,533,102 | A | * | 7/1996 | Robinson et al. | 379/67.1 |
| 5,671,269 | A | * | 9/1997 | Egan et al. | 379/142.01 |
| 5,724,419 | A | * | 3/1998 | Hatbuziuk et al. | 379/265 |
| 5,796,812 | A | * | 8/1998 | Hanlon et al. | 379/212.01 |
| 5,799,061 | A | | 8/1998 | Melcher et al. | |
| 5,799,074 | A | * | 8/1998 | Mano et al. | 379/142.01 |
| 6,038,291 | A | * | 3/2000 | Cannon et al. | 379/142.01 |
| 6,064,667 | A | * | 5/2000 | Gisby et al. | 370/352 |
| 6,185,287 | B1 | * | 2/2001 | Miloslavsky | 379/219 |
| 6,215,865 | B1 | * | 4/2001 | McCalmont | 379/212.01 |
| 6,222,913 | B1 | * | 4/2001 | Cho | 379/142.01 |
| 6,292,549 | B1 | * | 9/2001 | Lung et al. | 379/142.01 |

* cited by examiner

Primary Examiner—Curtis Kuntz
Assistant Examiner—Quoc D. Tran
(74) Attorney, Agent, or Firm—Townsend and Townsend and Crew LLP (57) ABSTRACT

A method for routing analog Caller ID signals includes receiving an incoming telephone call for a first telephone extension, the incoming telephone call associated with a first set of analog Caller ID signals, asserting a ringing signal to the first telephone extension, the ringing signal including the first set of analog Caller ID signals, coupling the incoming call to the first telephone extension, receiving a request to couple the incoming call from the first telephone extension to a second telephone extension, receiving a request to send the first set of analog Caller ID signals to the second telephone extension, and asserting a ringing signal to the second telephone extension, the ringing signal including the first set of analog Caller ID signals.

21 Claims, 4 Drawing Sheets

ANALOG CALLER IDENTIFICATION TRANSMISSION METHOD AND APPARATUS

CROSS-REFERENCES TO RELATED APPLICATIONS

This application is a continuation of U.S. application Ser. No. 09/255,359, filed Feb. 23, 1999; now U.S. Pat. No. 6,292,549 which claims priority to U.S. Patent Application No. 60/115,879, filed Jan. 13, 1999, entitled Telephone Server Method and Apparatus. That application is herein by incorporated by reference for all purposes.

BACKGROUND OF THE INVENTION

The present invention relates to computer telephony. More specifically, the present invention relates to telephone servers for transferring and forwarding analog caller identification data from incoming telephone calls.

Present day analog telephone systems in the United States typically rely upon standards set by Bellcore, the standards division of the former Bell Telephone Company. These exhaustive standards detail the magnitudes of a variety of telephone related signals, the periods of signals, the timings of signals, and the like. For example, these Bellcore standards specify a range of voltages necessary to power an analog telephone, a range for voltages necessary to ring a ringer of a telephone, methods for indicating when messages are waiting in a voice mail-type system, and the like. Many other such standards are also described, including the methods for encoding analog information, and the like.

In the past, typical private branch exchange (PBX) systems for large corporations included computer systems having proprietary switching hardware and proprietary control software. These traditional PBX systems were very costly in terms of the hardware and the software required, as well as very costly in terms of the maintenance and the service required. For example, traditional PBX systems typically ranged in cost of tens of thousands of dollars for a simple PBX system to hundreds of thousands of dollars for a large PBX system and on up. Such PBX systems were thus very costly, especially for smaller to medium sized businesses.

Within the past two decades, the PBX industry has migrated from traditional analog switching to high-speed digital switching systems. As a result of the conversion to digital switching, there has been a tremendous increase in telephone and switching functionality. For example, functionality such as call forwarding, conference calling, caller identification, and the like became relatively straightforward to program, to implement, and to maintain.

In order to provide the benefits of digital PBX system to users, digital telephones were developed for use with the respective PBX systems. With such digital telephones, the telephone signals, such as ringing, and voice, are typically transmitted in a conventional manner. However, additional digital data lines were provided to allow the user to send and receive digital data to and from the PBX system. For example, typical digital data included indicator lights, such as a message indicator light, telephone numbers of internal and external callers, speed dial functionality, do not disturb requests, and the like. These digital PBX systems, however, were still very expensive for small to medium sized businesses.

Only recently have solutions been developed to reduce the cost of PBX. This was due in part to the increased processing power of personal computers and the availability of more robust real-time multi-processing, multi-threaded operating systems. Other reasons for the paradigm shift from traditional PBX systems to "computer telephony" was the introduction of dedicated computer plug-in boards and software that provided PBX switching functionality.

The new computer telephony integration (CTI) model has drastically reduced the costs of PBX systems by providing relatively low cost hardware and open and maintainable software. One of the pioneering companies in the field of computer telephony integration was AltiGen Communications' AltiServ™ and Quantum™ products.

One drawback faced by many companies installing a traditional PBX system was that it typically required the purchaser of the PBX system to buy only digital telephones compatible with that PBX system. For example, digital telephones from Siemens would be required to work with a Siemens PBX, and the like. Digital telephones very thus expensive. For example, the cost of a typical digital office telephone today approaches approximately $250. In contrast, in the home/consumer market, an analog telephone having the some of the same functionality as the digital office telephone, or additional functionality (e.g. cordless) costs approximately $100.

Additional drawbacks to digital telephones for traditional PBX systems included that there is little if any market for compatible accessories, for example, answering machines, and the like. In contrast, in the home market, users can simply mix and match components for use with their analog telephones. For example, typical components include computer modems, answering machines, head sets, extension cords, and the like. In the home market, due to the large number of vendors and interchangeable products, these market forces keep the prices of analog telephone equipment low.

Other drawbacks to having traditional digital PBX systems include that installation of the PBX systems typically required a high degree of custom wiring, equipment, interfaces, and the like for the digital telephones. Further, installation of additional telephone extension lines would be a major undertaking. Another drawback is that because there is a great amount of dedicated hardware required for a typical PBX system, users would be typically be locked into a particular vendor after initial purchase, even if the service and support received was unacceptable.

Thus, in light of the above, what is needed in the industry are improved methods and apparatus using analog telephone equipment for PBX systems providing extended functionality.

SUMMARY OF THE INVENTION

The present invention relates to methods and apparatus for improved analog caller identification functionality. In particular, the present invention relates to re-generation and forwarding of analog caller identification signals using novel methods and apparatus.

According to an embodiment of the present invention, a method for routing analog Caller ID signals includes receiving an incoming telephone call for a first telephone extension, the incoming telephone call associated with a first set of analog Caller ID signals, asserting a ringing signal to the first telephone extension, the ringing signal including the first set of analog Caller ID signals, and coupling the incoming call to the first telephone extension. The method also includes receiving a request to couple the incoming call from the first telephone extension to a second telephone extension, receiving a request to send the first set of analog Caller ID signals to the second telephone extension, and asserting a ringing signal to the second telephone extension, the ringing signal including the first set of analog Caller ID signals.

According to another embodiment, a computer program product for routing analog identification data in a telephone server including a processor includes a tangible media including software code that directs the processor to detect an incoming telephone call for a first telephone extension, the incoming telephone call associated with a first set of analog identification data, software code that directs the processor to assert a ringing signal to the first telephone extension, the ringing signal including the first set of analog identification data, and software code that directs the processor to couple the incoming call to the first telephone extension. Software code that directs the processor to detect a request to couple the incoming call from the first telephone extension to a second telephone extension, and software code that directs the processor to detect a request to transfer the first set of analog information data to the second telephone extension, are also included. The tangible media also includes software code that directs the processor to assert a ringing signal to the second telephone extension, the ringing signal including the first set of analog information data.

According to yet another embodiment, a telephone server is disclosed for routing an analog information signal. The telephone server includes a processor and a computer readable memory. The computer readable memory includes executable code that directs the processor to detect a telephone call from an external telephone for a first internal telephone, the telephone call associated with an analog information signal, executable code that directs the processor to decode the analog information signal for caller data, and executable code that directs the processor to store the caller data. Executable code that directs the processor to form a re-generated analog information signal in response to the caller data, executable code that directs the processor to provide a ringer signal to the first internal telephone, the ringer signal including the re-generated analog information signal, and executable code that directs the processor to couple the telephone call to the first internal telephone, are also included. The computer readable memory also includes executable code that directs the processor to detect a request to forward the telephone call from the first internal telephone to a second internal telephone, executable code that directs the processor to detect a request to forward the caller data to the second internal telephone, and executable code that directs the processor to assert a ringer signal to the second internal telephone, the ringer signal including the re-generated analog information signal.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF THE SPECIFIC EMBODIMENTS

System Overview

Figure 1:
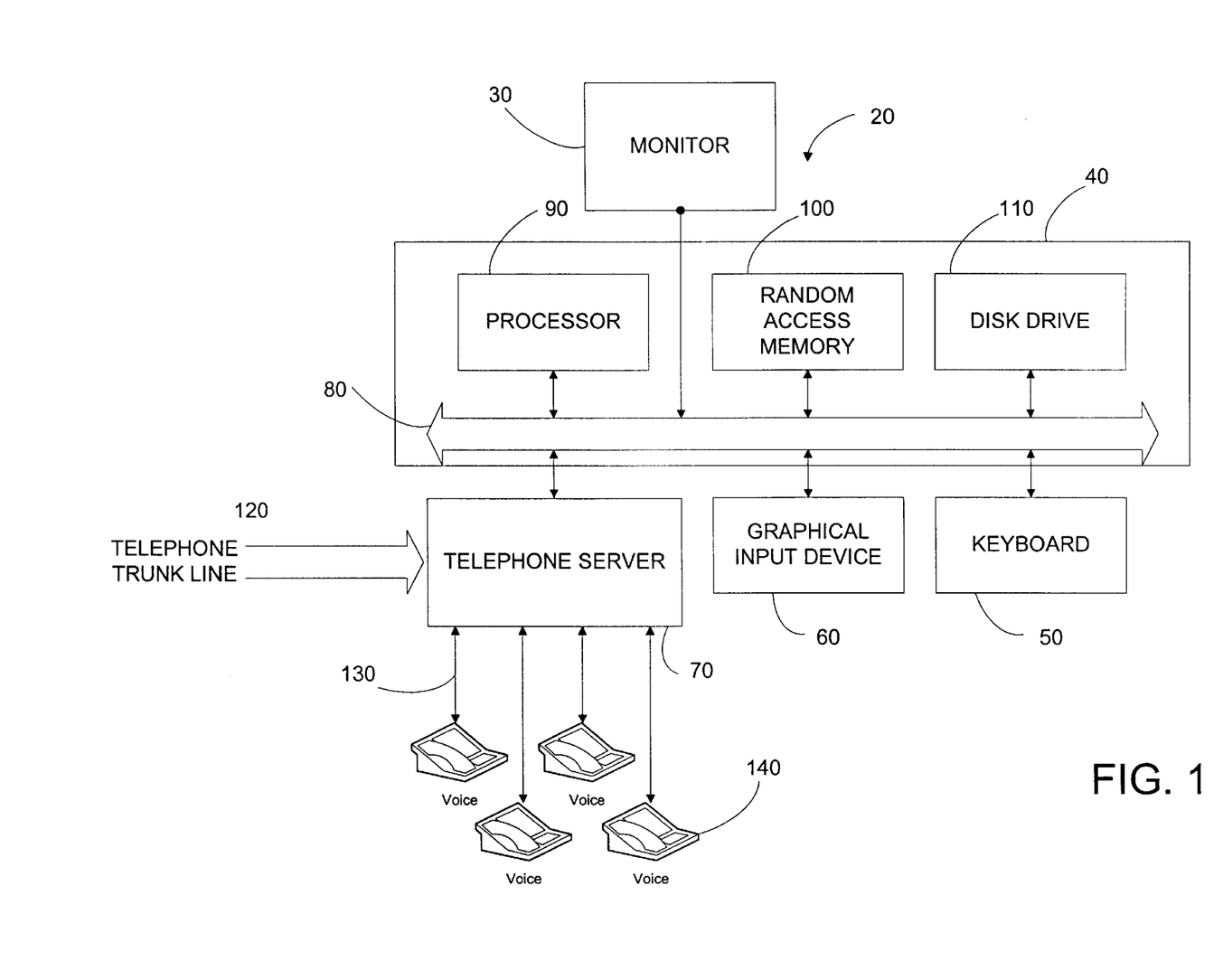
FIG. 1 is a block diagram of a computer telephony system according to a preferred embodiment of the present invention.

FIG. 1 is a block diagram of a computer telephony system 20 according to a preferred embodiment of the present invention. Computer telephony system 20 includes a monitor 30, a computer 40, a keyboard 50, a graphical input device 60, and a telephone server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telephone server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Computer telephony system 20 may be coupled to a computer network through use of a network interface, not shown, such as an Ethernet card, a modem, and the like.

RAM 100 and disk drive 110 are examples of tangible media for storage of data, message files, computer programs, drivers for the telephone server, embodiments of the herein described methods, and the like. Other types of tangible media include floppy disks, removable hard disks, optical storage media such as CD-ROMS and bar codes, and semiconductor memories such as flash memories, rod-only-memories (ROMS), and battery-backed volatile memories.

In a preferred embodiment, computer telephony system 20 includes an IBM PC compatible computer having '586 or '686 class based microprocessors, such Pentium® or PentiumII® microprocessors from Intel Corporation. Further, in the present embodiment, computer telephony system 20 operates utilizing the WindowsNT® operating from Microsoft Corporation, to run AltiWareOE& software from AltiGen Communications, Inc. Telephone server 70 is preferably embodied as a Quantum® PCI based plug-in expansion board from AltiGen Communications, Inc.

FIG. 1 is representative of but one type of system for embodying the present invention. It will be readily apparent to one of ordinary skill in the art that many system types of hardware and software configurations are suitable for use in conjunction with the present invention. For example, any computer communications bus may be used with alternative embodiments of the present invention, further computer telephony system 20 may operate under the LINUX operating system, may be ported onto a PowerPC G3 or G4 class microprocessor computer running MAC OS 8.5 from Apple Computer Corporation, and the like.

Hardware Description

Figure 2:
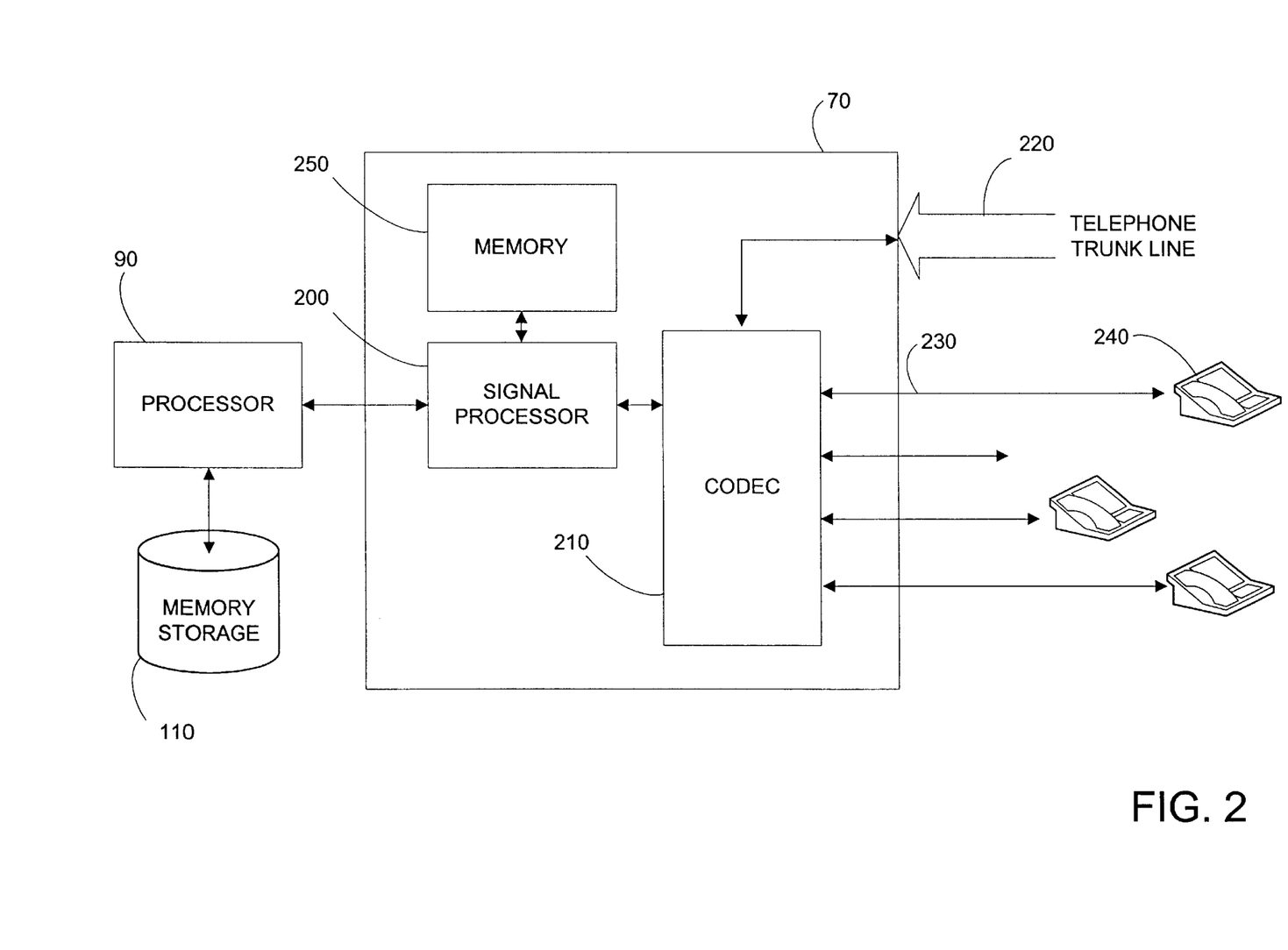
FIG. 2 is a more detailed block diagram of a portion of a computer telephony system according to an embodiment of the present invention.

FIG. 2 is a more detailed block diagram of a portion of a messaging system according to an embodiment of the present invention. FIG. 2 illustrates processor 90, disk drive 110, and telephone server 70. In the present embodiment, telephone server 70 includes a signal processor 200, a digital to analog and analog to digital coder (CODEC) 210, and a memory 250. Telephone server 70 interfaces with telephone trunk lines 220 and with telephone extension lines 230. In turn, telephone extension lines 230 are coupled to telephone handsets 240.

In the present embodiment, memory storage 110 is used to store audio messages, such as voice messages, numeric telephone numbers, caller data in caller databases, voice prompt files, and the like, as will be described later.

In FIG. 2, processor 90 is used to control the operation of telephone server 70 according to instructions from the AltiWareOEθ software previously described. In one embodiment of the present invention, AltiWareOEθ software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a storage format, and to convert message files and voice prompt files from the storage format to an output format (typically digital signals). In the present embodiment, two specific storage formats could be used for audio messages and include the well-known ".wav" file format, and a pulse coded modulation scheme (PCM).

In other embodiments of the present invention, a single storage format may be used. In other embodiments, other formats for storage of audio messages and the like are known to those of ordinary skill in the art and can be used. For example, formats such as the "RealAudio" format, MP3, and the like may be also be used in embodiments of the present invention.

Signal processor 200 is embodied as a Texas Instruments TMS320C5X digital signal processor (DSP), and is coupled to receive instructions, data, and the like from processor 90. Memory 250 is used to store local instructions, a voice recognition algorithm, discussed below, data for signal processor 200, and the like. Of course DSPs from other manufacturers may be used in other embodiments of the present invention.

In the present embodiment, signal processor 200 provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like.

Signal processor 200 is also used to provide messaging functionality, such as an implementation of a voice mail system. In particular, signal processor 200 outputs instructions, user prompts, messages, and the like, to the messaging user. Further, signal processor 200 receives function selections in the form of DTMF tones, spoken instructions, and the like from the messaging user. As discussed above, memory storage 110 may be used to store data associated with the messaging functionality, such as voice prompts, the incoming messages, outgoing messages, and the like.

Signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response.

In the present embodiment, signal processor 200 is also used to decode analog caller identification signals storing caller data. For example, typical caller data may include the telephone number of the telephone used for the call, a name associated with the telephone, and the like. Typically, the analog caller identification signals are embedded into an incoming telephone signal. One such method is commonly known as Caller ID, which is based upon a frequency shifted key (FSK) algorithm. Other methods for analog encoding caller identification signals are also contemplated.

Signal processor 200 is also used to re-encode caller data or to encode other data into analog caller identification signals. For example, signal processor 200 can be used to re-generate the original incoming analog caller identification signals, can be used to generate analog caller identification signals with original or additional caller data, and the like. In one embodiment, original data may include a telephone number, a name, and the like, and additional caller data may include a caller priority indicator, a geographic location, caller specific information, and the like.

In an alternative embodiment of the present invention, processor 90 may be used to perform the decoding and encoding process instead of signal processor 200. In still another embodiment, the encoding and decoding process may be split between processor 90 and signal processor 200.

Signal processor 200 typically comprises a multi-process environment wherein each process monitors the off-hook and the messaging the status of a particular telephone extension line 230. The status of the particular telephone extension line in off-hook mode or in the messaging mode is represented as respective state machines within signal processor 200. In one embodiment of the present invention, signal processor 200 can process up to twelve telephone extension lines being simultaneously in off-hook mode or in messaging mode. In alternative embodiments, monitoring of states of a greater or fewer number of telephone extension lines 230 is contemplated.

As illustrated in FIG. 2, CODEC 210 is used to provide an interface between users on telephone extension lines 230 and signal processor 200. In the present embodiment, CODEC 210 digitizes analog messages and analog signals from users on telephone extension lines 230. CODEC 210 also converts digital signals from signal processor 200, processor 90, and the like, into analog signals for users on telephone extension lines 230. In the present embodiment, the analog signals include audio messages to and from users, dial tone and multifunction (DTMF) tones, and the like. The analog signals also include voice prompts or phrases that provide voice prompting capability to users on telephone extension lines 230 and messages recorded by users. Examples of voice prompts or phrases, include messages that instruct the user which keys on a telephone to select to perform particular functions, messages that tell the user how many messages are pending, requests for instructions, requests user input, and the like.

Figure 3A:
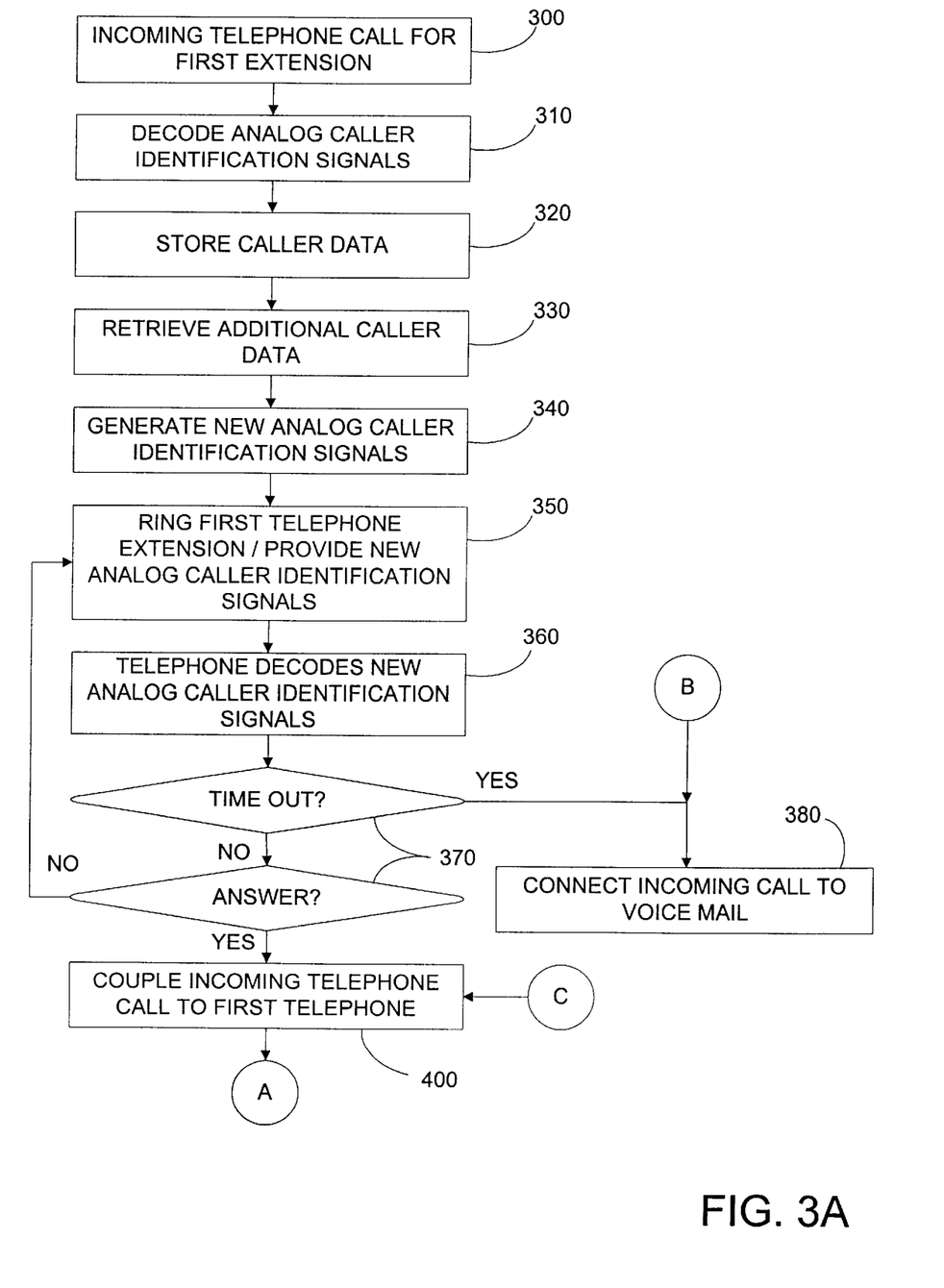
FIGS. 3A and 3B illustrate flow diagrams of an embodiment of the present invention.
Figure 3B:
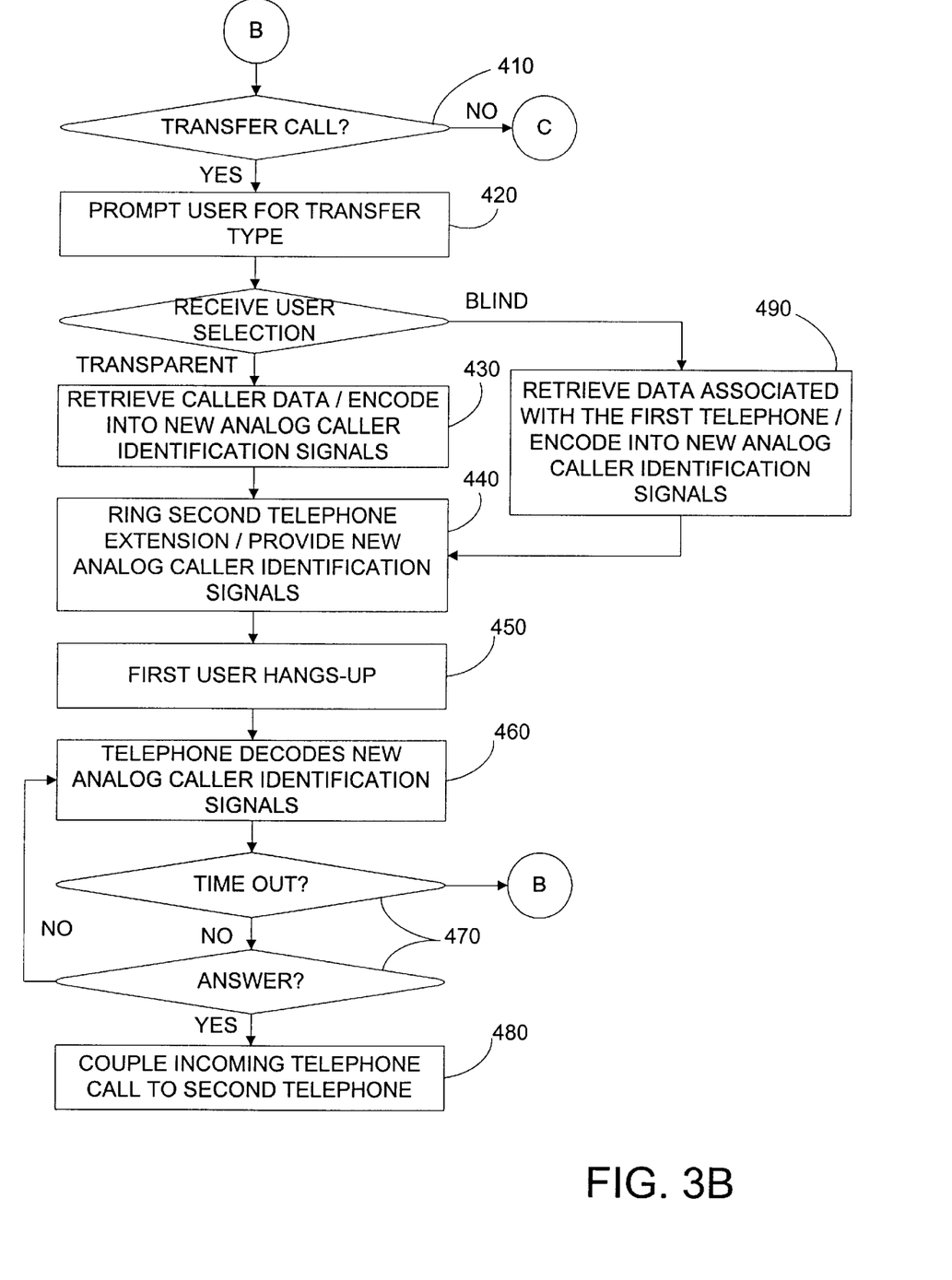

FIGS. 3A and 3B illustrate flowcharts of an embodiment of the present invention.

Initially an incoming telephone call arrives for a first telephone extension, step 300. The incoming call is typically an external telephone call from telephone trunk 220, although the call may also be from another internal telephone extension. The incoming call typically includes analog caller identification signals, such as Caller ID signals. In alternative embodiments of the present invention, other types of analog caller identification signals can be used, as discussed above.

In response to the incoming telephone call, signal processor 200 decodes the analog caller identification signals to recover the incoming caller data, step 310. Typical incoming caller data includes the telephone number used for the call, a name of the person, company, etc. associated with the telephone number, and the like. In other embodiments of the present invention, other types of incoming caller data may also be included into the analog caller identification signals, such as an address associated with the telephone number, a name and address of the caller, and other caller or telephone specific data.

The incoming caller data is typically stored in memory storage 110, step 320. Additionally, or in the alternative, the incoming caller data may be cached in memory 250 for later use. Next, additional data associated with the incoming caller data is retrieved from memory storage 110, step 330. In embodiments of the present invention, based upon the incoming caller data, a caller database in memory storage 110 may be used to retrieve the additional data such as a priority indicator, an internal contact person designated for the caller, a client name, names of products associated with the client, and the like. For example, based upon the incoming caller data, the additional data may indicate that the caller is from a large client, that the call should be routed to the Sales Manager, that the call is a high priority, that the client has purchased a particular number of Quantum™ boards, and the like.

Next, signal processor 200 retrieves the incoming caller data and the additional caller data, and encodes these data into re-generated analog caller identification signals, step 340. Typically the analog caller identification signals are encoded using the same encoding scheme used for the original analog caller identification signals. In the present embodiment, the encoding scheme is the Caller ID method. In alternative embodiments, different analog encoding schemes may also be used.

Signal processor 200 then provides a ringing signal to the first telephone extension, step 350. The ringing signal typically includes a ringing voltage signal with the re-generated analog caller identification signals embedded therein. In alternative embodiments of the present invention, the re-generated analog caller identification signals may be sent at a different time than the ringing voltage signal, for example, before any ringing voltage signal is applied.

Next, in response to the re-generated analog caller identification signals, the telephone coupled to the first telephone extension, decodes and displays the incoming caller data, and the additional caller data, if any, step 360. In response to the incoming caller data and the additional caller data, the first user may decide whether to answer the telephone or not. If the first telephone extension is not answered within a pre-determined period of time, step 370, the incoming telephone call is typically routed to a voice mail system destination, step 380. In alternative embodiments of the present invention, the incoming telephone call may be routed to other destinations, such as an attendant, an auto-attendant, another telephone extension, and the like. In embodiments where the incoming telephone call is not answered, the re-generated analog caller identification signals are provided when ringing the other destination.

When the first telephone extension is "picked-up" by a first user, the incoming call is coupled to the first telephone extension, step 400. In embodiments of the present invention, "picking-up" the phone may include removing a handset from the cradle, pressing a speaker-phone or headset button, using voice commands to direct telephone server 70 to connect the call, and the like.

In response to the incoming call, the first user or the caller may determine that the incoming call should be transferred or forwarded to a second user at a different telephone extension, step 410. For example, the caller may want to talk to users in different departments (at different telephone extensions), the first user or the caller may determine that the incoming call is more appropriate for another user in her department (at a different telephone extension), and the like. This step is typically initiated by the user pressing a "flash" button on her telephone, the switch-hook button on her telephone, and the like.

When the first user determines that the incoming call should be transferred, signal processor 200 prompts the user as to the type of transfer is desired, step 420. In the present embodiment, a "blind" transfer is when user data associated with the first telephone extension is transferred to the second telephone extension. This type of transfer is considered blind, for the user at the second telephone extension, the second user, is not made aware of the source of the call, the incoming call. In the present embodiment, an alternative type of transfer, a "transparent" transfer, is when analog caller identification signals associated with the incoming call are used. In particular, the caller data and the additional caller data are passed onto the second telephone extension. In response to the prompt, the user typically enters her transfer selection by pressing one or more keys on her telephone numeric keypad.

In alternative embodiments, additional types of transfers are envisioned. For example, in one embodiment, data associated with the first telephone extension and the caller data may be combined into an analog caller identification signal sent to the second telephone extension. In another embodiment, the caller data may be combined with a message entered by the first user into an analog caller identification signal. As an example, the user at the first telephone extension may press a series of keys on her numeric keypad to enter a brief message, a priority indicator, and the like.

In the case the first user selects a "transparent" transfer, signal processor 200 retrieves the incoming caller data and the additional caller data, and encodes these data into re-generated analog caller identification signals, step 430. Typically the analog caller identification signals are encoded using the same encoding scheme used for the original analog caller identification signals. In the present embodiment, the encoding scheme is the Caller ID method. In alternative embodiments different analog encoding schemes may also be used. Further, in alternative embodiments of the present invention, only the incoming caller data, or only the additional caller data are encoded into the re-generated analog caller identification signals, and the like.

Signal processor 200 then provides a ringing signal to the second telephone extension, step 440. The ringing signal typically includes a ringing voltage signal with the re-generated analog caller identification signals embedded therein. In alternative embodiments of the present invention, the re-generated analog caller identification signals may be sent at a different time than the ringing voltage signal, for example, after any ringing voltage signal is applied. In embodiments of the present invention, the ringing voltage signal may also have a different ringing pattern when receiving an internal telephone call versus an external telephone call.

Typically, the first user then hangs-up her telephone to complete the transfer, step 450.

Next, in response to the re-generated analog caller identification signals, the telephone coupled to the second telephone extension, decodes and displays the incoming caller data, and the additional caller data, if any, step 460. In response to the incoming caller data and the additional caller data, the second user may decide whether to answer the telephone or not. For example, if the second user is in a meeting, she may see that the telephone call is labeled "urgent", and interrupt the meeting to take the call. In another example, if the telephone call is an unwanted sales call, the second user may just ignore the call. If the second telephone extension is not answered within a pre-determined period of time, step 470, the incoming telephone call is typically routed to a voice mail system destination or other destinations as described in step 380, above.

When the second telephone extension is "picked-up" by a second user, the transferred call is coupled to the second telephone extension, step 480. In embodiments of the present invention, "picking-up" the phone may include removing a handset from the cradle, pressing a speakerphone or head-set button, using voice commands to direct telephone server 70 to connect the call, and the like.

In the case of a "blind" transfer, the re-generated caller identification signal includes data associated with the first telephone extension, step 490. In this embodiment, steps 440–480 are also performed.

In the present embodiment, the above process may be further repeated if the incoming telephone call needs to be forwarded or transferred to yet another telephone extension. Similar to the process described above, in one embodiment, the second user has the choice to request a blind or transparent forward or transfer. In alternative embodiments, additional data may be appended to the re-generated analog caller identification signal.

In another embodiment of the present invention, users can instruct signal processor 200 to automatically forward incoming telephone calls to another telephone extension. For example, if a user knows that she will work at a new office or cubicle for a short period of time, the user may instruct all incoming telephone calls to her original telephone extension be forwarded to her new office or cubicle. In this case, a default forwarding mode can be pre-set for her incoming calls. For example, any incoming telephone calls that are forwarded from her original telephone extension are then transparent forwards, not blind forwards.

In yet another embodiment, any transferring or forwarding of incoming telephone calls can default to transparent mode, unless a blind transfer is requested.

CONCLUSION

In the foregoing specification, the invention has been described with reference to specific exemplary embodiments thereof. Many changes, modifications, and enhancements are readily envisioned. For example, in one embodiment of the present invention, additional caller data may be output to a computer located in the same office as the telephone user. Further, as another example, a routing history of an incoming call may be output to the computer or stored as part of a re-generated analog caller identification signal. For example, a user can see if the caller has been bounced back and forth between different departments.

Other embodiments of the present invention may include combinations, sub-combinations, and or additions to the above disclosed embodiment. As an example, default modes for transfers or forwards of incoming telephone calls may be predetermined. As another example, the additional caller data need not be retrieved from memory storage 110 or used in conjunction with the analog caller identification signals.

The block diagrams of the architecture and flow charts are grouped for ease of understanding. However it should be understood that combinations of blocks, additions of new blocks, re-arrangement of blocks, and the like are contemplated in alternative embodiments of the present invention. Further, it should be understood that the terms used herein are not necessarily to be considered limiting. For example, the above embodiments describe analog caller identification signals, however, as used herein, the signals are simply analog signals that may include a telephone number, a name, customer data, and the like.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for routing analog Caller ID signals comprises:
   receiving an incoming telephone call for a first telephone extension, the incoming telephone call associated with a first set of analog Caller ID signals;
   asserting a ringing signal to the first telephone extension, the ringing signal including the first set of analog Caller ID signals;
   coupling the incoming call to the first telephone extension;
   receiving a request to couple the incoming call from the first telephone extension to a second telephone extension;
   receiving a request to send the first set of analog Caller ID signals to the second telephone extension; and
   asserting a ringing signal to the second telephone extension, the ringing signal including the first set of analog Caller ID signals.

2. The method of claim 1 wherein the first set of analog Caller ID signals comprises numbers.

3. The method of claim 2 wherein the numbers are encoded with a frequency key shift.

4. The method of claim 1,
   wherein the first set of analog Caller ID signals is also associated with caller data; and
   wherein the method also includes outputting the caller data.

5. The method of claim 4 further comprising:
   encoding the caller data into a second set of analog Caller ID signals;
   wherein the ringing signal also includes the second set of analog Caller ID signals.

6. The method of claim 1 wherein the ringing signal for the second telephone extension also includes a second set of analog Caller ID signals, the second set of analog Caller ID signals associated with the first telephone extension.

7. The method of claim 1 further comprising:
   after receiving the incoming telephone call for the first telephone extension, decoding the first set of analog Caller ID signals for caller data; and
   before asserting the ringing signal to the second telephone extension, encoding the caller data to regenerate the first set of analog Caller ID signals.

8. A computer program product for routing analog identification data in a telecommunication server including a processor comprises:
   code that directs the processor to detect an incoming telephone call for a first telephone extension, the incoming telephone call associated with a first set of analog identification data;

code that directs the processor to assert a ringing signal to the first telephone extension, the ringing signal including the first set of analog identification data;

code that directs the processor to couple the incoming call to the first telephone extension;

code that directs the processor to detect a request to couple the incoming call from the first telephone extension to a second telephone extension;

code that directs the processor to detect a request to transfer the first set of analog information data to the second telephone extension; and code that directs the processor to assert a ringing signal to the second telephone extension, the ringing signal including the first set of analog information data, wherein the codes are stored in a tangible media.

9. The computer program product of claim 8 further comprising code that directs the processor to output caller data;

wherein the first set of analog identification data is also associated with the caller data.

10. The computer program product of claim 9 further comprising:

code that directs the processor to encode the caller data into a second set of analog identification data;

wherein the ringing signal also includes the second set of analog identification data.

11. The computer program product of claim 8 wherein the ringing signal for the second telephone extension also includes a second set of analog identification data, the second set of analog identification data associated with the first telephone extension.

12. The computer program product of claim 11 wherein the second set of analog identification data comprises alphanumeric characters.

13. The computer program product of claim 8 further comprising:

code that directs the processor to decode the first set of analog identification data for caller data;

code that directs the processor to store the caller data; and code that directs the processor to re-encodes the caller data to regenerate the first set of analog identification data.

14. A telecommunication server including a processor for routing an analog information signal comprises:

a computer readable memory including:

code that directs the processor to detect a telephone call from an external telephone for a first internal telephone, the telephone call associated with an analog information signal;

code that directs the processor to decode the analog information signal for caller data;

code that directs the processor to store the caller data;

code that directs the processor to form a re-generated analog information signal in response to the caller data;

code that directs the processor to provide a ringer signal to the first internal telephone, the ringer signal including the re-generated analog information signal;

code that directs the processor to couple the telephone call to the first internal telephone;

code that directs the processor to detect a request to forward the telephone call from the first internal telephone to a second internal telephone;

code that directs the processor to detect a request to forward the caller data to the second internal telephone; and code that directs the processor to assert a ringer signal to the second internal telephone, the ringer signal including the re-generated analog information signal.

15. A telecommunication server of claim 14, wherein the caller data is also associated with other caller data in the computer readable memory; and wherein the computer readable memory also includes code that directs the processor to output the other caller data.

16. The telecommunication server of claim 15 wherein the code that directs the processor to output the other caller data comprises code that directs the processor to form an additional analog information signal in response to the other caller data; and wherein the ringing signal also includes the additional analog information signal.

17. The telecommunication server of claim 14 wherein the first internal telephone has associated telephone data; and the computer readable memory also includes code that directs the processor to form an additional analog information signal in response to the associated telephone data;

wherein the ringer signal for the second internal telephone includes the additional analog Information signal.

18. The telecommunication server of claim 17 wherein the additional analog information signal comprises characters from the class of ASCII characters.

19. The telecommunication server of claim 14 wherein code that directs the processor to form the re-generated analog information signal is also in response to data associated with the caller data.

20. The telecommunication server of claim 14 wherein the computer readable memory also includes:

code that directs the processor to prompt a user of the first internal telephone whether the caller data should be forwarded to the second internal telephone.

21. The telecommunication server of claim 20 wherein the caller data comprises Caller ID data.

* * * * *